(12) United States Patent
Kochert et al.

(10) Patent No.: US 7,059,481 B2
(45) Date of Patent: Jun. 13, 2006

(54) FILTER ELEMENT

(75) Inventors: Stefan Kochert, Hockenheim (DE); Klaus Moessinger, Obersulm (DE); Bernd Spaeth, Ulm (DE)

(73) Assignee: Mann & Hummel GmbH, Ludwigsburg (DE)

(*) Notice: Subject to any disclaimer, the term of this patent is extended or adjusted under 35 U.S.C. 154(b) by 88 days.

(21) Appl. No.: 10/465,787

(22) Filed: Jun. 20, 2003

(65) Prior Publication Data

US 2004/0031748 A1    Feb. 19, 2004

Related U.S. Application Data

(63) Continuation of application No. PCT/EP01/14251, filed on Dec. 5, 2001.

(30) Foreign Application Priority Data

Dec. 21, 2000   (DE)   ................. 100 63 881

(51) Int. Cl.
*B01D 29/00* (2006.01)
(52) U.S. Cl. ................. 210/437; 210/441; 210/450; 210/457; 210/497.1; 55/492; 55/502
(58) Field of Classification Search ................. 210/463, 210/441, 442, 462, 450, 499, 315, 457, 458, 210/497.1, 437, 497.01, 493.1; 55/492, 502; 116/230
See application file for complete search history.

(56) References Cited

U.S. PATENT DOCUMENTS

| | | | | |
|---|---|---|---|---|
| 560,441 A | * | 5/1896 | Smith | ................. 166/230 |
| 1,342,986 A | * | 6/1920 | Cater | ................. 166/230 |
| 2,217,370 A | | 10/1940 | Johnston | ................. 166/7 |
| 4,159,197 A | * | 6/1979 | Schuler et al. | ................. 55/379 |
| 5,238,717 A | * | 8/1993 | Boylan | ................. 428/35.7 |
| 5,293,935 A | * | 3/1994 | Arterbury et al. | ................. 166/228 |
| 5,549,821 A | * | 8/1996 | Bounnakhom et al. | ................. 210/232 |
| 5,580,456 A | | 12/1996 | Bowlsbey | ................. 210/493.2 |
| 5,660,729 A | * | 8/1997 | Baumann | ................. 210/457 |
| 5,681,461 A | * | 10/1997 | Gullett et al. | ................. 210/232 |
| 5,762,788 A | * | 6/1998 | Gullett | ................. 210/232 |
| 5,833,853 A | | 11/1998 | Carlson | ................. 210/497.01 |
| 5,897,779 A | * | 4/1999 | Wisted et al. | ................. 210/651 |
| 5,909,773 A | | 6/1999 | Koehler et al. | ................. 166/277 |

FOREIGN PATENT DOCUMENTS

| | | | |
|---|---|---|---|
| DE | 3723807 A | * | 1/1989 |
| DE | 19540876 | | 5/1997 |
| EP | 300182 A1 | * | 1/1989 |
| EP | 0568381 | | 2/1997 |
| WO | 98/15303 | | 4/1998 |

OTHER PUBLICATIONS

International Search Report.

* cited by examiner

*Primary Examiner*—Terry K. Cecil

(74) *Attorney, Agent, or Firm*—Crowell & Moring LLP

(57) ABSTRACT

A filter element (10) having a supporting body (11) around which a filter medium (12) is wound. The filter medium (12) is a weldable material and is sealingly affixed to the supporting body (11) two radial weld seams (18) and/or a longitudinal weld seam (19). The welding of the filter medium (12) onto the supporting body (11) eliminates the need to produce prefabricated tubes of filter medium, and enables the filter medium to be processed directly from a roll.

7 Claims, 5 Drawing Sheets

FILTER ELEMENT

CROSS REFERENCE TO RELATED APPLICATIONS

This application is a continuation of international patent application no. PCT/EP01/14251, filed Dec. 5, 2001, designating the United States of America, and published in German as WO 02/49738, the entire disclosure of which is incorporated herein by reference. Priority is claimed based on Federal Republic of Germany patent application no. DE 100 63 881.3, filed Dec. 21, 2000.

BACKGROUND OF THE INVENTION

This invention relates to a filter element for filtering a fluid stream comprising a fluid permeable, cylindrical supporting body having an outer surface and first and second end faces, and a filter medium surrounding the outer surface of the supporting body, and to an air filter comprising a housing with such a filter element disposed therein separating a housing inlet from a housing outlet.

German Patent application no. DE 37 23 807 discloses a tubular filter element formed by a rigid, radially perforated supporting tube, a filter medium and end disks. The outside of the supporting tube is covered by the filter medium. The end disks are made of plastic molded subsequently onto the supporting tube. The end disks seal the filter medium and thus affix the filter medium to the supporting tube.

It is known generally to cover supporting tubes with a prefabricated tubular filter medium. The filter medium may be sewn together, e.g., with a longitudinal seam, thus forming the tubular filter medium. This prefabricated tubular filter medium is pulled over the supporting tube in an assembly operation.

However, separate tubular filter media must be fabricated for each diameter of supporting tube, which results not only in a considerable logistical expenditure but also assembly costs and storage costs, In addition, many filter media in particular coated filter media in the prefabricated state, cannot be pulled over the supporting tube because they do not slide over the supporting tube.

SUMMARY OF THE INVENTION

It is an object of the invention to provide an improved filter element comprising a fluid permeable support body and a surrounding filter medium for filtering a fluid.

Another object of the invention is to provide a filter element comprising a supporting body and a surrounding filter element which can be manufactured easily and inexpensively.

These and other objects are achieved in accordance with the present invention by providing a filter element for filtering a fluid stream, said filter element comprising a fluid-permeable, tubular supporting body having an outer circumferential surface, a first end face and a second end face, and a weldable filter medium which surrounds the supporting body on the outer circumferential surface, said filter medium being affixed to the supporting body by at least one weld, wherein the supporting body has a radial circumferential sealing bead arranged on the outer circumferential surface in the vicinity of one of the two end faces, and wherein the sealing bead is sealingly engageable with a receptacle formed in a component which surrounds the filter element.

In accordance with a further aspect of the invention, the objects are achieved by providing an air filter comprising a housing having an inlet and an outlet, wherein the inlet is sealingly separated from the outlet by an interposed filter element installed in said housing, and wherein said filter element is a filter element as described above.

The filter element according to this invention is used for purifying or cleaning a fluid such as air. The filter element comprises a supporting body having an outer circumferential surface and two end faces as well as a weldable filter medium. The filter medium may be formed, for example, by a polyester fleece or nonwoven web. The supporting body has a generally tubular structure and may have any desired cross section, e.g., circular or oval.

In addition, the supporting body is permeable to the fluid to be purified. The permeability of the supporting body may be produced, e.g., by a plurality of apertures or openings in the supporting body or, in the case of an unperforated cylinder, by forming the supporting body of a fluid-permeable material. The openings may be designed in any shape, e.g., circular or rectangular.

The filter medium surrounds the supporting body on its outer circumferential surface and is welded by at least one weld to the supporting body. In welding the filter medium to the supporting body, the filter medium is compressed in the area of the weld, so that the weld does not rise higher than the other material. Therefore, various assembly variants may be constructed in this way which cannot be implemented with a higher applied seam such as that formed in seaming.

The supporting body is made of a weldable material which is fused at the surface in welding the filter medium, so that the filter medium enters into a bond with the supporting body in at least some spots. The filter medium may overlap partially, e.g., along the weld, so that the filter medium can be welded to itself and also to the supporting body with a seal. If the filter medium is welded to itself, no leakage can occur along the weld.

The filter medium may be unwound directly from a roll, wrapped around the supporting body, welded and cut off in one continuous operation, but the sequence of operations may also be varied. In one specific manufacturing process, several supporting bodies are covered with the filter medium in direct succession and then are separated by cutting off the filter medium. Since the filter medium is processed directly from the roll, this eliminates operations associated with prefabrication of a filter tubing, which is pulled over the supporting body. In addition, coated filter media which will not slide onto the supporting tube may also be wrapped around the supporting tube.

In accordance with one advantageous embodiment of the invention, the filter medium has a rectangular configuration and is welded along one longitudinal edge to the supporting body. The filter medium may already be precut or it may be uncoiled directly from a roll and then cut. The rectangular filter medium is wrapped around the supporting body in such a way that the beginning and the end overlap. Then the filter medium is welded.

It is advantageous if the supporting body has a circumferential radial sealing bead which is situated on the radially outer surface close to one of the two end faces. The sealing bead is sealingly supported in a receptacle which is arranged in a component such as a housing which surrounds the filter element. The sealing bead may be formed, e.g., by appropriately designing the supporting body itself or it may be constructed as a separate part. In the case of a separate part, a material which has sealing properties, such as polyurethane resin foam, may be selected.

In one specific embodiment of this invention, the filter medium surrounds the dealing bead and is secured in the vicinity of the sealing bead. In the area of the sealing bead, the weld may be interupted, or it may be designed to be continuous. In the case of an interrupted weld, which ends shortly before the sealing bead or which leaves an opening only for the sealing bead and runs together again after the sealing bead, the filter medium is flexible in the area of the sealing bad at all points, so that the filter medium is compressed in the receptacle during assembly. In this way a sealed connection is formed between the receptacle and the filter element without any additional seals.

According to another embodiment of this invention, the filter medium is connected to a gasket in one of the end faces of the supporting body, the gasket being supportable against a receptacle arranged on a part surrounding the filter element. The gasket is made of thermoplastic elastomer (TPE) or polyurethane resin foam, for example, which surrounds an end area of the supporting body and encloses an edge area of the filter medium at the end face. In this way, the filter medium is secured on the supporting tube. In addition, in conjunction with the receptacle, this ensures a sealed separation between the inlet and discharge flow sides of the filter element.

It is advantageous that a separate sealing segment on the first end face is connected only to the supporting body. The filter medium is separated from the sealing function due to this sealing segment. The filter medium sealingly surrounds the supporting body. The sealing segment merely seals the supporting tube with respect to the receptacle. Thus, when the filter medium is soiled, it may be removed from the supporting body and replaced with a new filter medium, but it is not necessary to replace the sealing segment, which is made of cellular or expanded rubber, for example. This makes it possible to replace the filter element in a way that is advantageous in terms of cost and materials.

According to another embodiment of this invention, the filter medium is wrapped in a spiral pattern around the supporting body, in which case the filter medium may be secured by a single weld along the spiral winding or by one weld on each end area on the outer circumferential surface close to the first and second end faces of the supporting body. In addition, these two variants may also be combined with each other, so that the filter medium is secured to the supporting body by three welds. The spiral winding of the filter medium is simple to produce, especially in a continuous operation. The properties of the filter element can be influenced by the tension on the filter medium and the winding angle of the winding, and therefore these parameters are to be adjusted in accordance with requirements. For example, the winding angle may be selected so that the filter medium surrounds the supporting body in two layers.

If the tension on the filter material is sufficiently great, the weld along the spiral winding may be omitted because the filter medium secures itself by the subsequent windings. In addition, it is also conceivable to apply an attachment or mounting band made of a weldable material, particularly a band made of a material which corresponds to the filter medium, in the area of the adjacent windings and then to weld the band subsequently to the filter medium.

In one advantageous embodiment, the filter element according to this invention is installed in an air filter. To this end, the air filter comprises a housing having a cover and a container. The container is connected to the cover with a seal. The filter element is introduced into the housing in such a way that an unfiltered side is sealingly separated from a filtered side. The housing has an inlet through which the fluid to be filtered can enter and an outlet through which the filtered fluid can flow out.

According to another embodiment, the filter element according to this invention is installed as a secondary element in the air filter. The air filter still has a primary filter element which is formed, e.g., by a filter element folded in a star pattern. The primary filter element separates the impurities. As long as it is intact, the secondary element does not come in contact with the impurities in the fluid. If the primary filter element is defective or missing, the secondary element will purify the fluid sufficiently to avoid causing any damage to downstream components, such as an internal combustion engine.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
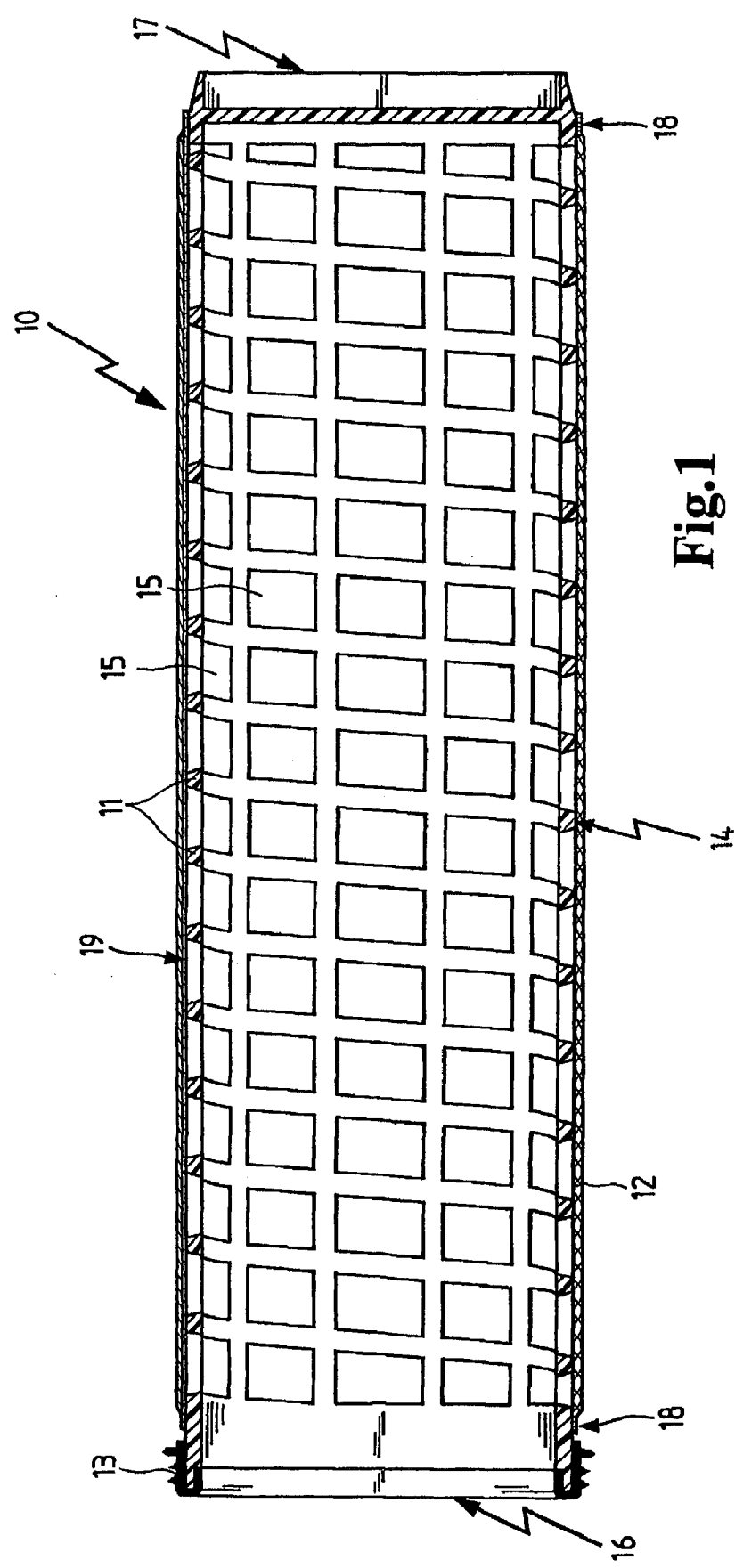
FIG. 1 is a sectional view of a filter element according to the invention.

FIG. 1 shows a sectional view of a filter element 10. Filter element 10 is formed by a supporting body 11, a filter medium 12 and a sealing segment 13. Supporting body 11 is designed as a circular cylinder made of synthetic resin material (i.e., plastic). In order for the fluid that is to be filtered to be able to pass through supporting body 11, supporting body 11 has a plurality of openings 15 on its outer circumferential surface 14. The openings 15 in this illustrative embodiment are designed with a rectangular shape. However, other embodiments, e.g., with circular or triangular openings 15, are also possible.

The supporting body 11 has a first end face 16 and a second end face 17. The outer circumferential surface 14 in the area of end faces 16, 17 does not have any openings 15, so that no fluid can pass through the supporting body 11 at these points. The sealing segment 13 is provided on the end face 16, which is designed to be open. This sealing segment 13 is a component which is mounted on the supporting body 11 and encloses the first end face 16, so that the filter element 10 can be introduced into a receptacle (not shown) with a seal. The sealing segment 13 does not come in contact with the filter medium 12. The second end face 17 is designed to be closed accordingly, so that even without a sealing counterpart (not shown), it prevents unpurified fluid from escaping from a crude side (not shown).

Filter medium 12 is comprised of a weldable polyester fleece or nonwoven web, which surrounds the supporting body 11 in the area where the openings 15 are arranged on its outer circumferential surface 14. In this illustrative embodiment, the filter medium 12 is sealingly secured to the supporting body 11 by two radial welds 18 and one longitudinal weld 19. The filter medium 12 is compressed in the area of the welds 18, 19.

Figure 2:
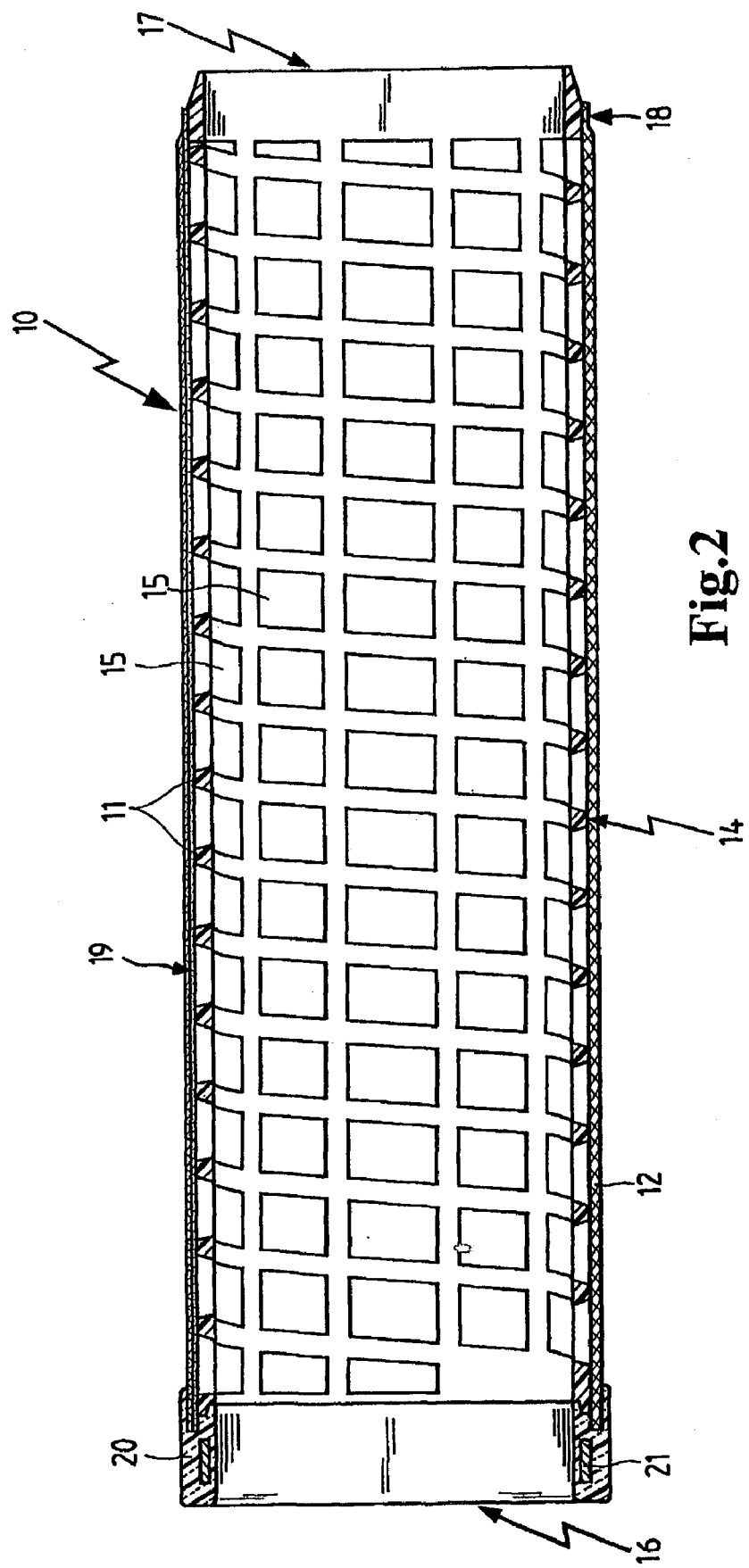
FIG. 2 is sectional view of a variant of the filter element of the invention.

FIG. 2 shows a sectional view of a variant of the filter element 10. Components corresponding to those in FIG. 1 are identified by the same reference numbers. In this variant, the filter medium 12 is affixed to the supporting body 11 by a longitudinal weld 19 and a radial weld 18. In the area of the first end face 16, the filter medium 12 is secured by a gasket 20. This gasket 20 is made of polyurethane resin (PUR) foam, which is connected to the filter medium 12 and to the supporting body 11. If desired, a supporting ring 21 may be integrally cast in the gasket 20 to stabilize the gasket.

In this illustrative embodiment, the second end face 17 is designed to be open. When the filter element 10 is installed in a housing (not shown), both the first end face 16 and the second end face 17 are to be introduced into a receptacle (not shown) with a seal.

Figure 3:
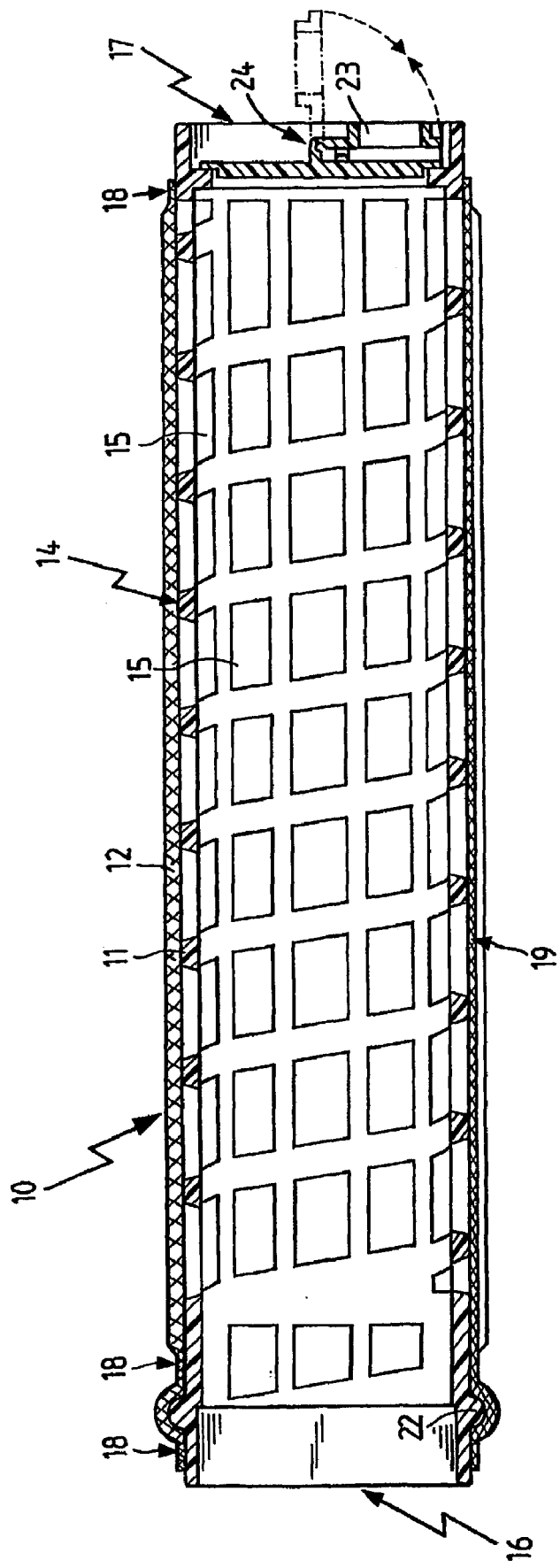
FIG. 3 is a sectional view of another variant of the filter element of the invention.

FIG. 3 shows a sectional view of another variant of a filter element according to the invention. Components which correspond to those in FIG. 1 are identified by the same reference numbers. The supporting body 11 has a radially extending sealing bead 22 running annularly around the outer circumferential surface 14 in the vicinity of the first end face 16. The filter medium 12 covers the sealing bead 22 completely and is affixed to the supporting body 11 by a radial weld 18 both before and after the sealing bead 22. In addition, the longitudinal weld 19 is arranged so it is axially parallel to the supporting body 11, which ends in front of the sealing bead 22.

When the filter is assembled, that part of the filter medium 12 which covers the sealing bead 22 is compressed in the receptacle (not shown). Consequently, the filter medium 12 is in sealing contact with this receptacle (not shown) and thus any leakage flow around the filter is prevented from developing.

In the area of the second end face 17, the filter medium 12 is also attached to the supporting body 11 with a radial weld 18. The second end face 18 is designed to be closed, with a lifting latch 23 being provided so that the filter element 10 can be extracted from its receptacle (not shown). This lifting latch 23 is connected by a film hinge 24 to the supporting body 11. To dismantle the filter element 10, the lifting latch 23 is rotated 90° (shown in a broken line) so that axial pulling forces can be transferred to the filter element 10.

Figure 4:
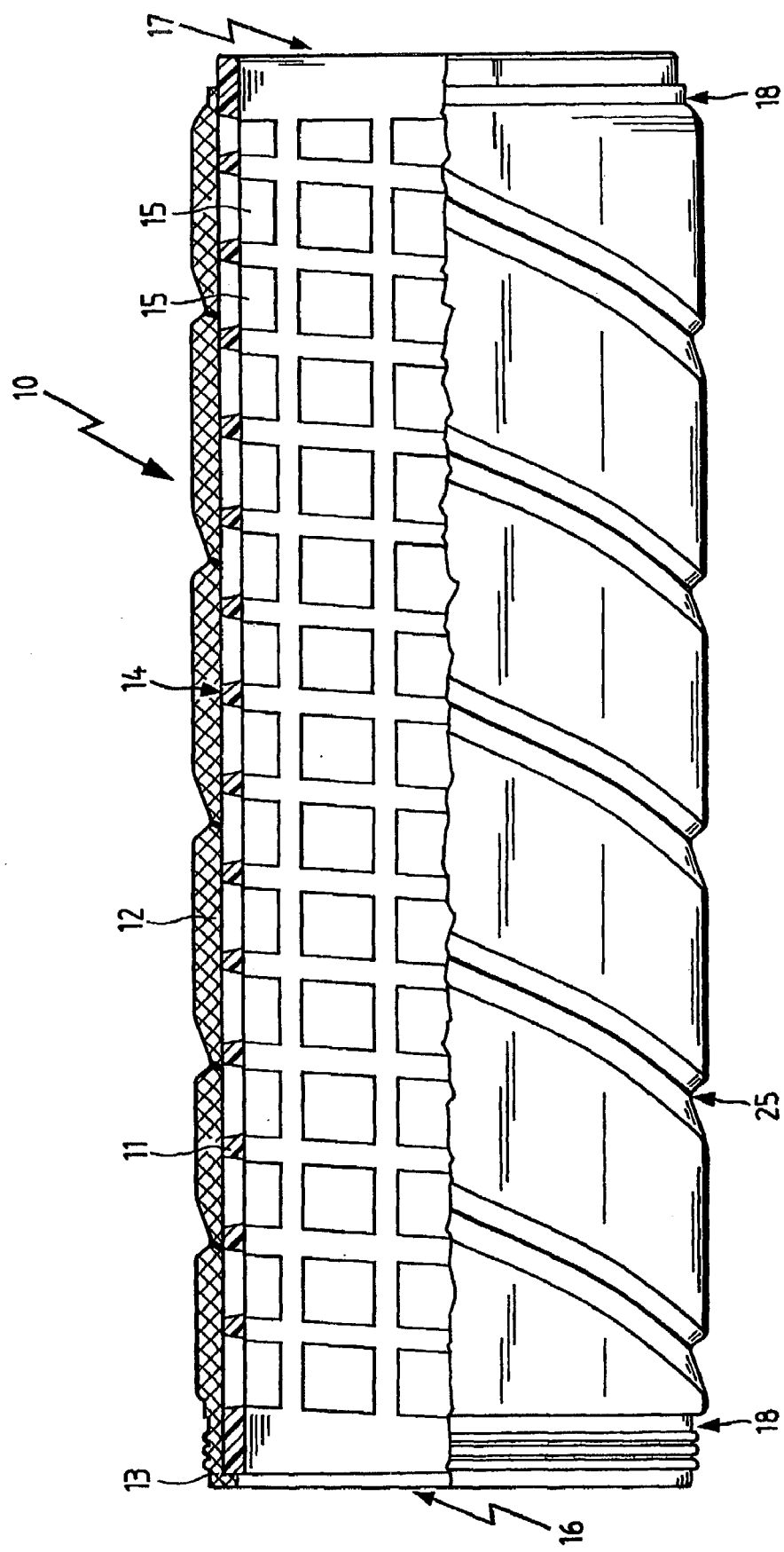
FIG. 4 is a partial sectional view of yet another variant of the filter element according to the invention.

FIG. 4 shows a partially sectional view of one variant of a filter element according to the invention. Components corresponding to those in FIG. 1 are identified by the same reference numbers. In this illustrative embodiment, the filter medium 12 is wound in a spiral pattern around the supporting body 11. To secure the filter medium 12, a radial weld 18 is provided in the vicinity of each of the end faces 16, 17. In addition, the filter medium 12 is connected to the supporting body 11 by a spiral weld 25. This spiral weld 25 extends along the joint of the filter medium 12. When the filter medium 12 is wound is an overlapping manner, the spiral weld 25 could also extend along the center of the overlapped area or it could be omitted if the filter medium is wound under sufficient tension to hold it against the supporting body.

Figure 5:
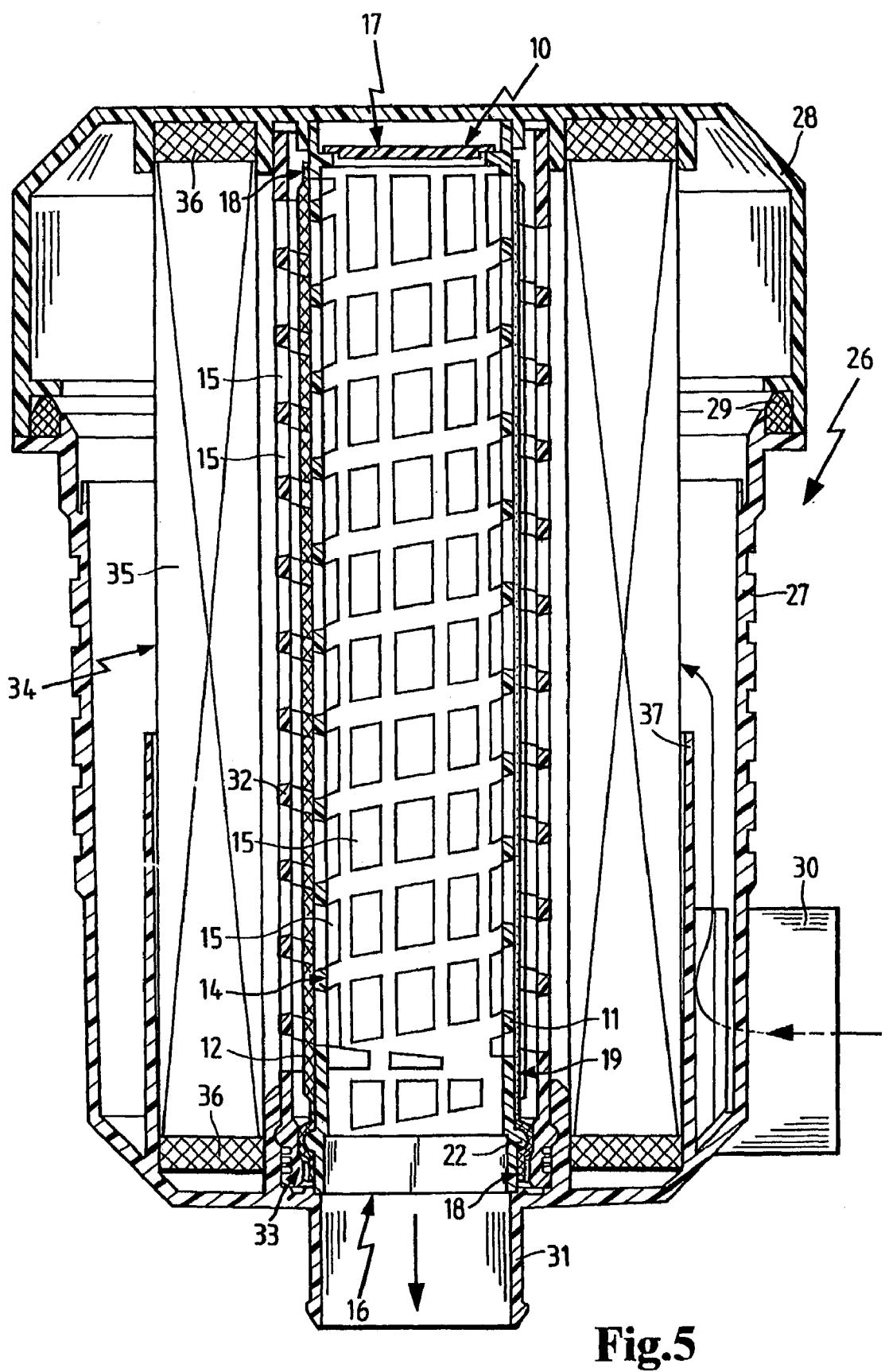
FIG. 5 is a sectional view of an air filter incorporating a filter element according to the invention.

FIG. 5 shows an air filter in a sectional view. Components corresponding to those shown in FIG. 3 are identified by the same reference numbers. The air filter has a cylindrical housing 26 made of synthetic resin material which comprises a container 27 and a cover 28. The container 27 is connected to the cover 28 with a seal provided by the sealing means 29. The container 27 has an inlet 30 opening tangentially near the bottom and an outlet connection 31 which is arranged centrally.

A filter element 10 as illustrated in FIGS. 1 through 4, is installed in the housing 26. The filter element 10 is arranged coaxially with the outlet connection 31, and is surrounded by a hollow cylindrical primary supporting tube 32 which, like supporting body 11, is made of synthetic resin material and has openings 15. On the inside of this primary supporting tube 32 there is a receptacle 33 in which the filter element 10 together with its sealing bead 22 covered by the filter medium 12 is supported with a seal in the vicinity of the first end face 16.

A primary filter element 34, which is folded in a star pattern and closed in a annular shape, is arranged around the primary supporting tube 32 and is installed in the housing 26 with a seal. This primary filter element 34 is comprised of a filter paper 35 and two end disks 36, which are sealingly connected to the filter paper.

The end disks 36 are made of a resilient or elastic material which has sealing properties, such as polyurethane resin foam. In order for the air flowing in through the inlet 30 not to reach the primary filter element 34 at only one location, the container 27 has a flow guide baffle or wall 37 against which the incoming air must first rise before it flows through the primary filter element 34.

If the primary filter element 34 is damaged or missing, the filter element 10 will separate the inlet 30 from the outlet connection 31 with a seal in the direction of the arrow, so that the air is first purified partially and flows out through the outlet connection 31.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element for filtering a fluid stream, said filter element comprising a fluid-permeable, tubular supporting body having an outer circumferential surface, a first end face and a second end face, and a weldable filter medium which surrounds the supporting body on the outer circumferential surface, said filter medium being affixed to the supporting body by at least one weld, wherein the supporting body has a radial circumferential sealing bead arranged on the outer circumferential surface in the vicinity of one of the two end faces, wherein the sealing bead is sealingly engageable with a receptacle formed in a component which surrounds the filter element and wherein the filter medium surrounds the sealing bead and is affixed to the supporting body in the vicinity of the sealing bead.

2. A filter element according to claim 1, wherein the filter medium is constructed with a rectangular shape and is welded to the supporting body by a longitudinal weld.

3. A filter element according to claim 1, wherein a sealing segment adjacent the first end face is mounted solely to the supporting body.

4. A filter element according to claim 1, wherein the filter material is wound in a spiral around the supporting body.

5. A filter element according to claim 4, wherein the filter medium is affixed to the supporting body by a first radial weld on the outer circumferential surface in the vicinity of the first end face and by a second radial weld on the outer circumferential surface in the vicinity of the second end face.

6. An air filter comprising a housing having an inlet and an outlet, wherein the inlet is sealingly separated from the outlet by an interposed filter element installed in said housing, and wherein said filter element is a filter element according to claim 1.

7. An air filter according to claim 6, wherein said filter element is a secondary filter element, and further comprising a primary filter element installed in said housing between said inlet and said secondary filter element.

* * * * *